V. E. KING.
SHUTTLE RIDING PLOW.
APPLICATION FILED NOV. 14, 1914.
1,152,896.
Patented Sept. 7, 1915.
2 SHEETS—SHEET 1.
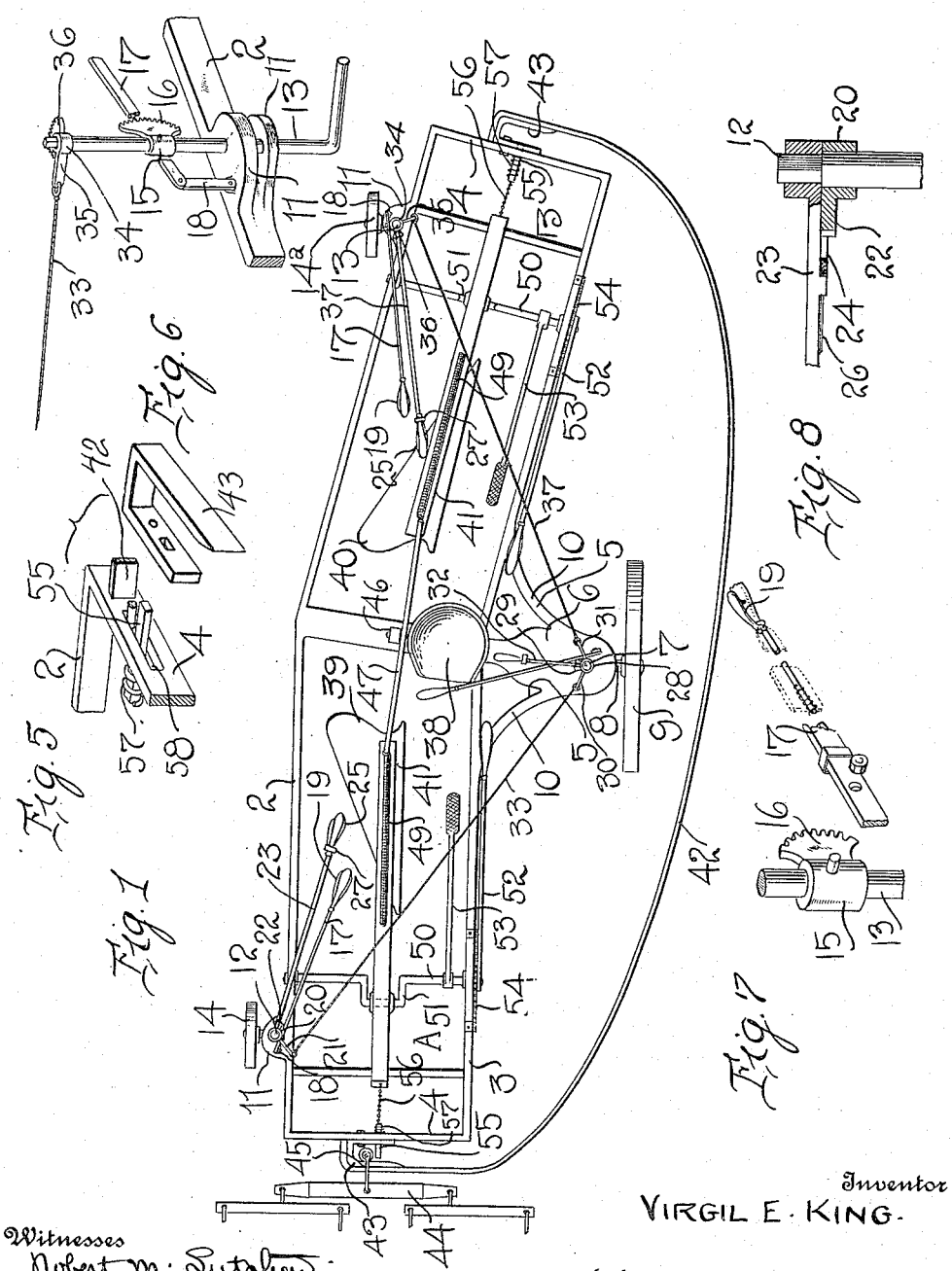
Witnesses
Robert M. Sutphen
A. L. Hind
Inventor
VIRGIL E. KING.
By Watson E. Coleman
Attorney

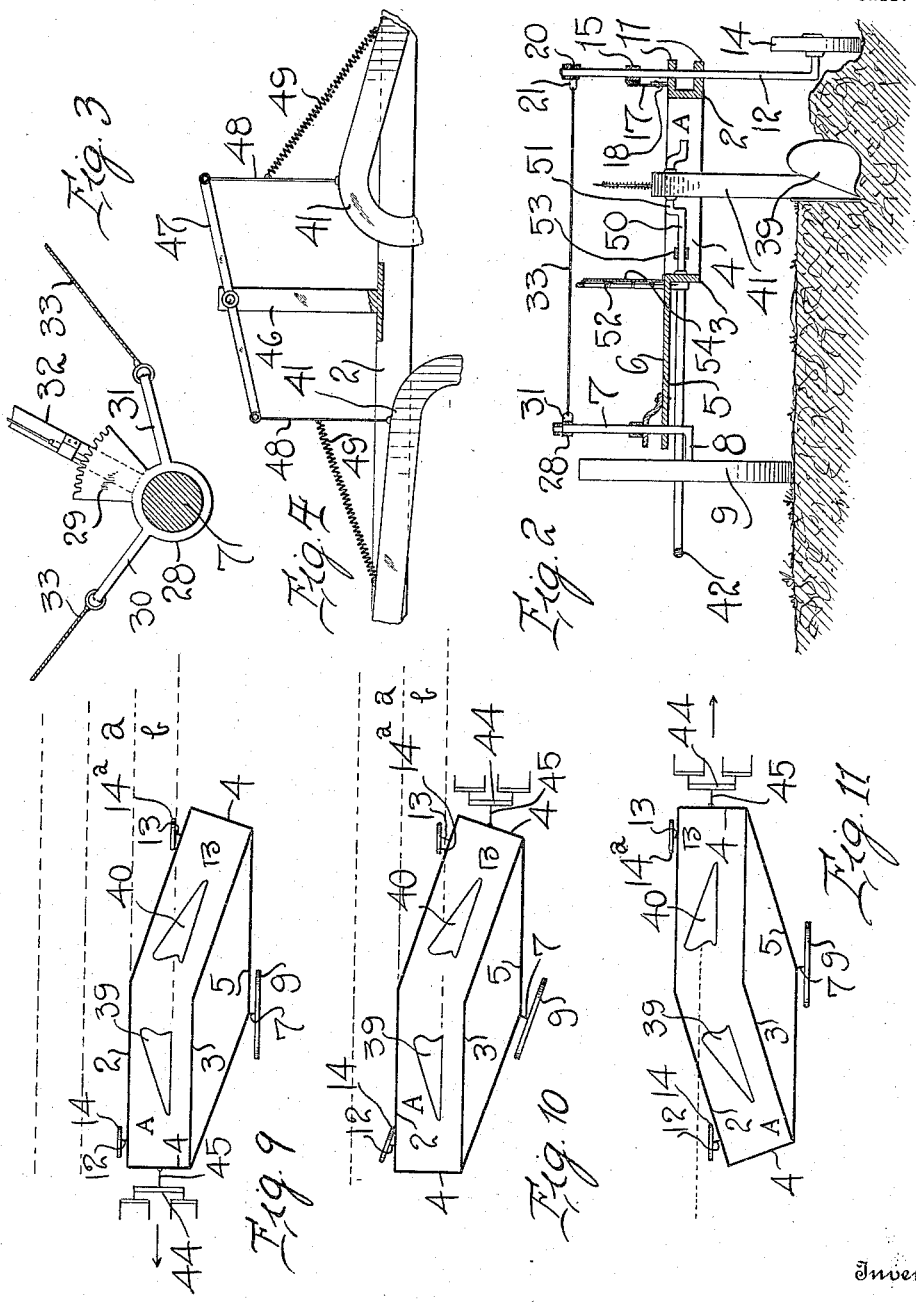

UNITED STATES PATENT OFFICE.

VIRGIL E. KING, OF PALMYRA, ILLINOIS.

SHUTTLE RIDING-PLOW.

1,152,896.  Specification of Letters Patent.  Patented Sept. 7, 1915.

Application filed November 14, 1914. Serial No. 872,239.

*To all whom it may concern:*

Be it known that I, VIRGIL E. KING, a citizen of the United States, residing at Palmyra, in the county of Macoupin and State of Illinois, have invented certain new and useful Improvements in Shuttle Riding-Plows, of which the following is a specification, reference being had to the accompanying drawings.

My invention relates to agricultural implements, and particularly to riding plows.

The primary object of my invention is the provision of a plow so constructed that it need not be turned around at the ends of the field while plowing, but that it operates back and forth across the field without being turned around. It is for this reason that I have used the term "shuttle" as definitive of the peculiar characteristics of the plow.

A further object of the invention is the provision of a plow of this character so formed, as before stated, that it may operate shuttle-wise back and forth across the field, thereby doing away with all dead furrows and other furrows, ditches or depressions usually left by the ordinary plows now in use.

A further object of the invention is to so construct a plow that the team, after the plow has been taken in one direction across the field, will be disconnected from one end of the plows, and without being disconnected from the plow body as a whole, may travel around to the other end of the plow ready for the trip back across the field.

Another object of the invention is the provision of a plow of the character described in which an angular frame is provided and in which oppositely directed plows are carried on each arm of the frame, so that the line of draft for one plow will be at an angle to the line of draft of the other plow, and provide in connection therewith means whereby that end of the plow which has been in advance traveling in one direction across the field may be laterally shifted automatically to bring it on the land side of that portion of the plow frame which was heretofore in the rear.

A further object of the invention is to provide in connection with the construction described means whereby the several wheels supporting the plow frame may be shifted either independently or all together, so as to secure the proper connecting of the plow and the proper shifting of the rear end of the plow frame upon starting a new furrow.

Still another object of the invention is to provide means whereby the plow frame may be raised and lowered with reference to the wheels.

Other objects will appear in the course of the following description.

My invention is illustrated in the accompanying drawings, wherein—

Figure 1 is a plan view of my plow; Fig. 2 is a transverse section thereof; Fig. 3 is a fragmentary plan view, the shaft 7 being in section; Fig. 4 is a fragmentary elevation showing the means for elevating or lowering the plow beams; Fig. 5 is a fragmentary perspective view of one of the cross bars 4 showing the locking bolt; Fig. 6 is a perspective view of a portion of the frame, one of the wheel carrying shafts and its actuating mechanism; Fig. 7 is a perspective view, with the parts detached, of the mechanism whereby the frame may be raised and lowered relative to the shaft; Fig. 8 is a detail elevation, partly in section, of one of the wheel shafts showing the means for rotating the shaft; Figs. 9, 10 and 11 are diagrammatic views showing the operation of the plow.

Corresponding and like parts are referred to in the following description and designated in all parts of the accompanying drawings by like reference numerals.

Referring to these drawings, it will be seen that the supporting frame of the plow comprises the angular parallel side members 2 and 3 and the end members 4. These side members 2 and 3 are obtusely angled longitudinally so as to provide two arms to the plow frame, these arms being designated A and B to distinguish them from each other. An element 5 which is reversely angled to the beam 2 and 3 is also formed with or attached to the frame so that its apex projects out toward the land side of the plow. This element 5 simply forms braces supporting a horizontally extended beam or member 6, this member extending beyond the ends of the braces to provide a bearing for a vertical shaft 7 whose lower end is angularly bent as at 8 and carries upon it the relatively large wheel 9. The braces 5 on each side of this wheel 9 are inwardly curved as at 10 to permit the wheel to be reversed. One end of the beam 2 is provided with outwardly projecting supporting lugs 11 on which is mounted the vertically disposed shaft 12 and at the opposite end of the beam 2 is provided with like laterally projecting lugs 11 in which is mounted the vertically arranged shaft 13. The shafts 12 and 13 are both angularly bent at their lower ends, and carry upon these angularly bent ends the furrow wheels 14 and 14$^a$, both of these wheels being alike. The shafts 7, 12 and 13 pass loosely through said supporting lugs so that the frame may be vertically adjusted with relation to these shafts, and for this purpose there is attached to each shaft a collar 15 upon which is formed a sector 16. Pivotally attached to this collar and sector is a lever 17, the short end of which is connected by means of a link 18 to the adjacent portion of the frame. The lever 17 is provided with a detent tooth adapted to engage with the rack teeth on the sector 16, this detent tooth being forced inward into engagement by a spring and raised out of said engagement by means of a hand-piece 19, as is usual in constructions of this character. It will be obvious that by forcing down upon the handle of the lever the frame will be raised relatively to the corresponding shaft, and by raising up upon the handle of the lever the frame may be depressed by its own weight. It will of course be understood that each shaft passes through the collar 15 loosely so that the shaft may turn freely.

Mounted upon the shaft 12 is a collar 20, and extending from this collar is a radially projecting arm 21 and a radially projecting toothed sector 22. The upper end of the shaft is squared, and mounted upon this squared portion so as to rotate the shaft is a lever 23. This lever is formed with a detent latch 24, a hand grip 25 a rod 26 and a spring throwing the latch inward. It will be obvious now that the lever 23 will move with the shaft 12 in its rotation and that by the lever the shaft may be manually rotated. It will also be seen that when the tooth 24 is engaged with the teeth of the sector 22 the lever and the sector together with the arm 21 will have unitary movement. If, however, the latch 24 is disengaged from the teeth of the sector and held out of engagement, then the lever 23 and the shaft 12 may rotate without in any manner affecting the sector on the arm 21. The latch 24 may be held out of engagement with the sector by means of a bail 27 or other suitable device, which may embrace the hand grip 25 and hold it closed against the end of the lever. The shaft 7 is provided with a like arrangement to the shaft 12, thus there is provided a collar 28 having a toothed sector 29 and having two diverging radially projecting arms 30 and 31. The collar 28 is loosely mounted upon the shaft 7 to rotate independently thereof. Also mounted upon the shaft 7 and turning therewith is the lever 32 having a detent latch engageable with the teeth of the sector 29 and having a hand grip whereby this detent latch may be released from engagement with the sector. The arm 30 is connected with the arm 21 by means of a wire rod or like connection 33. Loosely mounted upon the shaft 13 is a collar 34 having a radially projecting arm 35 and a sector 36, and mounted upon the squared end of the shaft is a hand lever 37 having a detent latch of the character previously described engageable with the sector 36. This arm 35 is connected by the rod 37 to the arm 31.

It will be obvious, supposing the latches of all of the levers are engaged with their respective sectors, that a rotation of any one shaft will cause a like rotation of both the other shafts. If the latch of one of the levers is raised out of engagement with its sector while the latches of the other two levers are in engagement with their sectors, then the first named shaft is free to operate without affecting the other shafts, but the other two shafts will move in correspondence. Thus it is within the power of the operator seated upon the rotatable seat 38 to control the movement of the several wheels and also to control which wheels shall be moved.

Disposed between the beams 2 and 3 are the plows 39 and 40. These plows are mounted upon beams 41 of ordinary construction, and the beams so mounted upon the plow frame that when one plow is lowered the other is raised, and vice versa, the raising and lowering of the beams being accomplished by means of a system of hand levers and foot levers, which will be later described. It will of course be understood that the plows 39 and 40 are reversely placed with relation to each other so as to be directed oppositely and so that the land sides of both plows are presented in the same direction.

Preferably attached to the end bars 4 of the frame and extending around the exterior of the wheel 9 is a rod 42 forming what may be termed a track extending from one end of the plow to the other. This track at each end is inwardly bent and attached to the end bar of the frame so as to form what may be termed a loop. This loop is reinforced by an extra piece forming a hook and designated 43 so as to reinforce the rod 42 where the greatest strain is exerted upon it. The double trees 44 whereby the draft animals are hitched to the plow frame are connected to a shackle 45 which is bifurcated to embrace the rod 42 and the inner end of which is provided with an anti-friction roller or pulley 46 which bears against the face of the track or guide rod 42. Means are provided for automatically engaging the shackle with the closed ends of the rod 42, as will be later described, this means being so constructed that in backing the team the shackle 45 will be automatically released from engagement with the reinforced portion 43 of the rod, and that the team may be turned and may be guided to either end of the plow from the shackle and automatically engaged and held in engagement with the other end of the plow frame. The means for this purpose will be later described.

The operation of my invention is best seen by reference to the diagrammatic view in Figs. 9 to 11. In Fig. 9 the plow is supposed to be going in the direction of the arrow. The arm A of the plow frame is therefore disposed parallel to the line of draft. All of the wheels 9, 14 and 14$^a$ are therefore disposed parallel to the line of draft. The wheel 14 is running in a furrow $a$ which has been previously made. The wheel 14$^a$ is running in a new furrow $b$ which is being made by the plow 39, while the wheel 9 is running on the unplowed ground. The rear portion of the frame B is extending of course at an angle to the line of draft, the plow 40 being idle and being raised out of engagement with the ground by the usual devices previously referred to. Now when the plow has reached the end of the field it is not turned about as is the case with ordinary plows, but the horses are driven around the track 42 to the end of the arm B. This time the plow is in the position shown in Fig. 10. The wheel 14$^a$ is disposed in the furrow $b$ and is in proper position for a return movement of the plow across the field; the wheel 14$^a$ therefore does not have to be changed in position. As the plow 39 still sits over a furrow already plowed and must therefore be separated from the unplowed land by a width equal to the width of the plow, the rear end of the plow frame must be slewed laterally so as to take the position shown in Fig. 11, thus bringing the forward end B parallel to the line of draft and the rear arm A at an angle to the line of draft. This is accomplished by the operator releasing the engagement of the lever 16 with the sector 15, the detent tooth being held from its engagement by the bail 27 previously referred to. The team passes around the track or rod 42 and is ready to start, except that the rear end of the plow is the width of a furrow too far toward the plowed ground. The levers 23 and 32 are not released from their engagement with the corresponding sectors, and hence the arms 30 and 21 work in unison and the shafts 7 and 13 will also work in unison, so that the driver by means of the lever 32 may turn the wheels 9 and 14 so as to set the frame and plow 40 directly over the land. As before stated, the wheel 14$^a$ was in proper position when the plow started, and is therefore not affected by the turning of the wheels 9 and 14. When the plow frame is in proper position the lever 37 is released so as to again connect the arm 8 to the shaft 12 and all the wheels are again connected for unitary movement. The same operation is carried out at the other end of the field, except that it is the lever 23 in this case which is released from its engagement with the sector 22 so as to leave the wheel 14 free from turning movement.

It is to be understood that the levers 17 are simply used for adjusting the height of the frame with relation to the several wheels and are not used for the purpose of raising or lowering the plows out of or into the ground, and the levers 17 are used for lifting the frame. After the plow frame has been set for the work to be done, the levers 17, which are operatively connected to the furrow wheels are scarcely ever used, and the one in connection with the land wheel 9 will be used according to the nature or the unevenness of the ground. By the use of the three levers 17 the plow can be set to run perfectly level, which cannot be done where the frame is stationary at one wheel, as with ordinary wheel plows.

The specific means for mounting the plow beams may be varied if desired. I have devised for this purpose the construction shown in Fig. 4. From this figure it will be seen that there is bolted to the frame of the plow a vertically extending standard 46 to the upper end of which is pivoted an arm 47, this arm extending longitudinally of the frame. From the ends of this pivoted cross piece or arm there depend the rods 48 which are connected respectively to the plow beams 41. It will therefore be seen that when the plow 39 is raised the plow 40 will be lowered, and vice versa. Springs 49 are also connected between the rods 48 and the forward ends of the respective plow beams to assist in raising and lowering the plows. Each plow beam is operatively connected to a transverse shaft 50 whose middle is cranked as at 51, one end of the shaft being provided with a hand lever 52 and also with a foot lever or treadle 53. The hand lever 52 operates over a sector 54 and the hand lever is provided with a detent mechanism engageable with the teeth of the sector to hold the hand lever set in any adjusted position.

For the purpose of locking the shackle of the draft mechanism in position at one end or the other of the guide rod or track 42 I provide at each end of the frame a bolt 55 which at its inner end is connected to the corresponding plow beam by a chain or like flexible connection, and is outwardly urged by a spring 57. This bolt is carried by the hook member 43 and operates through a slot 58 in the frame within which the hook member is adjustable, so that the hook member when it engages the shackle and bolt may be adjusted toward or from the land side. When the plows are disposed at the same height by the raising of one plow and the lowering of the other the bolts 55 are both released, permitting the draft animals to move from one end of the plow to the other. When one plow is further lowered and when one is further raised, the bolt connected with the lowered plow will automatically be projected by means of the spring 57, thus locking the shackle in place.

Having described my invention, what I claim is:

1. In a reversible plow, a frame, reversed plows mounted thereon in offset relation, furrow wheels disposed at the ends of the frame, a land wheel intermediate the ends of the frame, shafts extending upward from the wheels to said frame, and manually operable means for independently moving any one, or unitarily moving all of said shafts.

2. In a reversible plow, a frame, reversed plows mounted thereon in offset relation, furrow wheels disposed at the ends of the frame, a land wheel intermediate the ends of the frame and on the opposite sides of the frame to the furrow wheel, vertically disposed shafts passing through the frame and carrying said wheels, manually operable levers extending from each shaft, and means for independently moving any one of, or unitarily moving all of said shafts.

3. In a reversible plow, a frame, reversed plows mounted thereon in offset relation, furrow wheels disposed at the ends of the frame, a land wheel intermediate the ends of the frame and on the opposite side of the frame to the furrow wheels, vertically disposed shafts passing through the frame and carrying said wheels, manually and independently operable levers extending one from each shaft, and means for causing the simultaneous operation of the land wheel lever and either of the furrow wheel levers or the simultaneous operation of the land wheel lever and both of the furrow wheel levers.

4. In a reversible plow, a frame having its end portions angularly disposed with relation to each other, reversed plows mounted one in each end portion, a frame having a lateral extension on its reëntrant side, a vertical shaft extending downward through said extension, a land wheel carried by said shaft, vertical shafts disposed at the ends of the frame and on the side opposite the land wheel, furrow wheels carried thereby and manually operable means for controlling the rotation of said shafts.

5. In a reversible plow, a frame, having its end portions angularly disposed with relation to each other, reversed plows mounted one in each end portion, a frame having a lateral extension on its reëntrant side, a vertical shaft extending downward through said extension, a land wheel carried by said shaft, vertical shafts disposed at the ends of the frame and on the side opposite the land wheel, furrow wheels carried thereby and manually operable means for connecting all of the shafts to each other for common rotary movement or connecting the land wheel shaft and either of the furrow wheel shafts for common rotary movement.

6. In a reversible plow, a frame, having its end portions angularly disposed with relation to each other, and having a lateral extension on its reëntrant side, vertical shafts disposed at the ends of the frame at one side thereof opposite said extension, furrow wheels mounted on said shafts, a vertical shaft disposed on the end of said extension, a land wheel carried thereby, manually operable means for rotating each of said shafts independently of any other shaft to change the direction of the corresponding wheel, manually controlled means for connecting the land wheel shaft to either or both of said furrow wheel shafts for unitary movement, a guide member attached at its ends to the opposite ends of the frame and extending in a horizontal plane from one end of the frame to the other and exterior to said extension, a draft appliance having engagement with the guide member and movable therealong from one end of the frame to the other, reversed plows carried one in each end portion of the frame, means for raising or lowering the plows with relation to the frame, and means for raising or lowering each of said shafts with relation to the frame.

7. In a plow of the character described, a plow frame, reversely directed plows mounted upon the plow frame, a track or guide rod attached at one end to one end of the plow frame and extending out laterally again along the plow frame and attached to the other end thereof, a draft appliance including a shackle slidably engaged with said rod and movable from one end to the other thereof, means for raising either one of the plows and simultaneously lowering the other plow, and bolts operatively connected each to the corresponding plow and adapted to be retracted by the lowering of the corresponding plow or projected by the raising of said plow, said bolts when projected holding the shackle at the corresponding end of the track or rod.

8. In a plow of the character described, a plow frame, reversely directed plows mounted upon the frame, a track or guide rod attached at one end to one end of the plow frame, extending out laterally from the plow frame and attached to the other end thereof, a draft appliance including a shackle slidably engaged with said rod and movable from one end to the other, shackle engaging hooks and spring actuated bolts disposed at each end of the frame, each of said hooks and bolts being adjustable toward or from the land side of the plow, means whereby the plows may be reversely raised or lowered, and means operatively connecting the bolts to the respective plows, whereby to cause the retraction of one bolt and the projection of the other bolt upon a vertical adjustment of the plows.

9. A plow comprising a frame having two portions disposed at an angle to each other and in a relatively horizontal plane, means for applying draft to either end of the frame to thereby cause one of said portions to be disposed in the line of draft and the other at an angle thereto, reversely directed plows operatively mounted each on one of said portions, and means for rendering either one of said plows inactive and the other active.

10. A plow including a frame having two main portions disposed at an angle to each other in a horizontal plane, reversely directed plows each mounted upon one of the portions of the frame, means for rendering one of said plows active and the other inactive, and means for applying draft to opposite ends of the frame and including a track extending from one end of the frame to the other end thereof, a draft appliance, and a shackle slidably engaging the draft appliance with the track.

11. A plow including a frame having two main portions disposed at an angle to each other in a horizontal plane, reversely directed plows each mounted upon one of the portions of the frame, means for rendering one of said plows active and the other inactive, and means for applying draft to opposite ends of the frame and including a track extending from one end portion to the other and being disposed on the reëntrant side of the frame, a shackle having sliding engagement with said track, and a draft appliance operatively connected to the shackle.

12. A plow including a frame having two main portions disposed at an angle to each other in a horizontal plane, reversely directed plows each mounted upon one of the portions of the frame, means for rendering one of said plows active and the other inactive, and means for applying draft to opposite ends of the frame and including a track projecting outward from one end of the frame, then extending laterally toward the reëntrant side of the frame, then extending longitudinally to the other end of the frame laterally across the end of the frame and then inward into engagement with the frame, angular reinforcing members mounted in the ends of said track, a shackle having sliding engagement with the track, and a draft appliance mounted upon said shackle.

13. In a plow of the character described, a frame having two portions disposed both in a horizontal plane and angularly disposed relatively to each other, supporting wheels mounted upon said frame, reversely directed plows operatively mounted each on one of said portions of the frame, means for rendering one of said plows inactive and the other active, a track attached at its ends to the opposite ends of the frame and extending from one end of the frame to the other, a draft appliance having slidable engagement with the track and movable from one end to the other, and means at opposite ends of the track for automatically engaging the draft appliance and holding it in detachable engagement therewith.

14. In a plow of the character described, a frame having two portions disposed both in a horizontal plane and angularly disposed relatively to each other, supporting wheels mounted upon said frame, reversely directed plows operatively mounted each on one of said portions of the frame, means for rendering one of said plows inactive and the other active, a track attached at its ends to the opposite ends of the frame and extending from one end of the frame to the other, a draft appliance having slidable engagement with the track and movable from one end to the other, means engaging the draft appliance at opposite ends of the track to hold the draft appliance from movement along the track, and means for automatically releasing said draft appliance engaging means.

15. In a plow of the character described, a supporting frame having two portions disposed at an angle to each other and both in a substantially horizontal plane, supporting wheels for said frame, reversely directed plows mounted each upon one portion of the frame, means for rendering either one of said plows active and simultaneously rendering the other plow inactive, a track attached to opposite ends of the frame and extending from one end to the other thereof, a draft appliance having sliding engagement with the track and movable thereon from one end of the frame to the other, means for automatically locking the draft appliance at one end of the frame or the other, and means for automatically releasing the said locking means when the plow at the adjacent end of the frame is rendered inactive to thereby permit the team to move around to the other end of the frame.

16. In a plow of the character described, a frame having two portions disposed in a horizontal plane and in angular relation to each other, oppositely directed plows each mounted upon one of said portions, a seat supported in the middle of the frame, a land wheel mounted at the middle of the frame but to one side thereof, furrow wheels rotatably mounted on the frame adjacent opposite ends thereof and on the side opposite the land wheel, means for independently or unitarily rotating said land and furrow wheels, a track attached to opposite ends of the frame and extending from one end to the other, a draft appliance having sliding engagement with said track whereby the draft may be shifted from one end of the frame to the other, means for raising either one of said plows and simultaneously lowering the other plow, means for engaging the draft appliance with one or the other ends of said track, and means for automatically releasing said engaging means when the adjacent plow is raised to an inactive position.

17. In a plow of the character described, a supporting frame, furrow wheels disposed in spaced relation and upon the same side of the frame, each furrow wheel being rotatable in a horizontal plane, a land wheel disposed between the furrow wheels but on the opposite side of the frame and rotatable in a horizontal plane, means for applying draft to either end of the frame, manually operated means for rotating one or the other of the furrow wheels into angular relation to the line of draft without rotating the other furrow wheel, and means for unitarily rotating the land wheel with either of the furrow wheels.

18. In a plow of the character described, a supporting frame, longitudinally spaced furrow wheels mounted upon one side of the frame for rotation in a horizontal plane, a land wheel disposed on the opposite side of the frame but on a line extending between the furrow wheel, means for simultaneously rotating the land wheel and either one of the furrow wheels without rotating the other furrow wheel, and means for applying draft to either end of the frame.

In testimony whereof I hereunto affix my signature in the presence of two witnesses.

VIRGIL E. KING.

Witnesses:
JOSEPH F. GALLOWAY,
JOSEPH F. LAMELINO.

Copies of this patent may be obtained for five cents each, by addressing the "Commissioner of Patents, Washington, D. C."